US011068747B2

United States Patent
Goldstein et al.

(10) Patent No.: US 11,068,747 B2
(45) Date of Patent: Jul. 20, 2021

(54) COMPUTER ARCHITECTURE FOR OBJECT DETECTION USING POINT-WISE LABELS

(71) Applicant: Raytheon Company, Waltham, MA (US)

(72) Inventors: Jonathan Goldstein, Fredericksburg, VA (US); Philip A. Sallee, South Riding, VA (US); James Mullen, Leesburg, VA (US); Franklin Tanner, Ashburn, VA (US)

(73) Assignee: Raytheon Company, Waltham, MA (US)

( * ) Notice: Subject to any disclaimer, the term of this patent is extended or adjusted under 35 U.S.C. 154(b) by 115 days.

(21) Appl. No.: 16/586,480

(22) Filed: Sep. 27, 2019

(65) Prior Publication Data
US 2021/0097345 A1    Apr. 1, 2021

(51) Int. Cl.
*G06K 9/62* (2006.01)
*G06T 7/60* (2017.01)
(Continued)

(52) U.S. Cl.
CPC ......... *G06K 9/6257* (2013.01); *G06K 9/6262* (2013.01); *G06K 9/6267* (2013.01);
(Continued)

(58) Field of Classification Search
CPC .. G06K 9/6257; G06K 9/6267; G06K 9/6262; G06K 9/00771; G06K 9/00281; G06K 9/00624; G06K 9/3233; G06K 9/4652; G06K 2209/21; G06T 7/70; G06T 7/60; G06T 7/11; G06T 7/246;
(Continued)

(56) References Cited

U.S. PATENT DOCUMENTS 8,571,271 B2 * 10/2013 Yuan ................ G06T 7/11
382/117
8,600,108 B2 * 12/2013 Tang ................ G06T 7/246
382/103
(Continued)

FOREIGN PATENT DOCUMENTS

AU    2019203471 B2    11/2020

OTHER PUBLICATIONS

U.S. Appl. No. 16/413,731, filed May 16, 2019, Machine Learning Using Informed Pseudolabels.
(Continued)

*Primary Examiner* — Michael S Osinski
(74) *Attorney, Agent, or Firm* — Schwegman Lundberg & Woessner, P.A.

(57) ABSTRACT

A neural network apparatus includes processing circuitry and memory. The memory stores a plurality of images of a target. The processing circuitry is configured to: access, from the memory, a first image and an identification of a centroid pixel of the target within the first image; generate, based on a geometry of the target and the centroid pixel, a confidence map indicating, for each pixel in the first image, a confidence value that the pixel includes the target; train, using the plurality of images of the target, including the first image and the confidence map, an artificial neural network to identify the target in visual data; and provide an output representing the trained artificial neural network.

20 Claims, 6 Drawing Sheets

(51) Int. Cl.
  *G06T 7/70* (2017.01)
  *G06N 3/04* (2006.01)
  *G06N 3/08* (2006.01)
(52) U.S. Cl.
  CPC ............... *G06N 3/04* (2013.01); *G06N 3/08* (2013.01); *G06T 7/60* (2013.01); *G06T 7/70* (2017.01); *G06K 2209/21* (2013.01); *G06T 2207/20081* (2013.01); *G06T 2207/20084* (2013.01)
(58) Field of Classification Search
  CPC ......... G06T 7/277; G06T 7/143; G06T 7/251; G06T 2207/20081–20084; G06T 2207/10016; G06T 2207/20076; G06T 2207/10024; G06N 3/04; G06N 3/08
  See application file for complete search history.

(56) References Cited

U.S. PATENT DOCUMENTS

| | | | |
|---|---|---|---|
| 9,275,308 B2 | 3/2016 | Szegedy et al. | |
| 9,418,319 B2 | 8/2016 | Shen et al. | |
| 9,424,493 B2 | 8/2016 | He et al. | |
| 9,514,389 B1 | 12/2016 | Erhan et al. | |
| 9,542,626 B2 | 1/2017 | Martinson et al. | |
| 9,965,719 B2 | 5/2018 | Choi et al. | |
| 10,109,052 B2* | 10/2018 | Chefd'hotel | G06T 7/0012 |
| 10,304,193 B1 | 5/2019 | Wang et al. | |
| 10,489,635 B2* | 11/2019 | Tan | G06K 9/00234 |
| 10,671,875 B2* | 6/2020 | Yamamoto | G06K 9/4604 |
| 10,699,421 B1* | 6/2020 | Cherevatsky | H04N 7/181 |
| 2004/0017930 A1* | 1/2004 | Kim | G06K 9/00228 382/103 |
| 2008/0166045 A1* | 7/2008 | Xu | G06T 7/251 382/170 |
| 2009/0034805 A1* | 2/2009 | Perlmutter | G06F 16/5838 382/118 |
| 2011/0160543 A1* | 6/2011 | Parsey | A61B 6/501 600/300 |
| 2011/0254950 A1* | 10/2011 | Bibby | G06T 7/149 348/135 |
| 2012/0121132 A1* | 5/2012 | Asahara | G06K 9/00201 382/103 |
| 2012/0201464 A1* | 8/2012 | Fukui | G06K 9/00624 382/195 |
| 2012/0301024 A1* | 11/2012 | Yuan | H04N 1/624 382/167 |
| 2012/0327188 A1* | 12/2012 | Takemura | G08G 1/16 348/46 |
| 2014/0072170 A1* | 3/2014 | Zhang | G06K 9/00624 382/103 |
| 2015/0278601 A1* | 10/2015 | Nagamine | G06T 7/277 382/103 |
| 2016/0026848 A1 | 1/2016 | Hamid et al. | |
| 2016/0196665 A1* | 7/2016 | Abreu | G06T 7/251 345/427 |
| 2016/0224833 A1* | 8/2016 | Jin | G06K 9/4619 |
| 2017/0147905 A1 | 5/2017 | Huang et al. | |
| 2017/0169567 A1* | 6/2017 | Chefd'hotel | G06T 7/0012 |
| 2017/0316285 A1 | 11/2017 | Ahmed et al. | |
| 2018/0211130 A1 | 7/2018 | Jiang | |
| 2019/0228318 A1* | 7/2019 | Kwant | G06N 5/022 |
| 2019/0354857 A1 | 11/2019 | Sallee et al. | |
| 2019/0370551 A1* | 12/2019 | Mao | G06K 9/03 |
| 2019/0392268 A1* | 12/2019 | Tariq | G06K 9/00791 |
| 2020/0267373 A1* | 8/2020 | Jian | H04N 13/246 |
| 2020/0412937 A1* | 12/2020 | Huang | H04N 5/23219 |

OTHER PUBLICATIONS

"Australian Application Serial No. 2019203471, First Examination Report dated Apr. 9, 2020", 6 pgs.
"Australian Application Serial No. 2019203471, Response filed Jun. 23, 2020 to First Examination Report dated Apr. 9, 2020", 67 pgs.
Bekker, A J, et al., "Training deep neural-networks based on unreliable labels", IEEE International Conference on Acoustics, Speech and Signal Processing (ICASSP), Shanghai, (2016), 2682-2686.
"Softmax Cross Entropy", Google Authors, [Online] Retrieved from the Internet: <URL: https://www.tensorflow.org/versions/r1.15/api_docs/python/tf/losses/softmax_cross_entropy>, (2019), 2 pgs.
Abadi, Martin, et al., "Tensorflow: a system for large-scale machine learning.", 12th USENIX Symposium on Operating Systems Design and Implementation., (2016), 265-283.
Angluin, D., et al., "Learning from noisy examples", Machine Learning, 2(4)., (1988), 343-370.
Beigman, E, et al., "Learning with annotation noise", In Proceedings of the Joint Conference of the 47th Annual Meeting of the ACL and the 4th International Joint Conference on Natural Language Processing of the AFNLP, vol. 1, (2009), 280-287.
Bradley, Andrew, "The Use of the Area Under the ROC Curve in the Evaluation of Machine Learning Algorithms", in the Journal of Pattern Recognition, vol. 30, No. 7, (1997) 1145-1159.
Brodley, Carla, et al., "Identifying Mislabeled Training Data", Journal of Artificial Intelligence Research 11, (1999), 131-167.
Bylander, Tom, "Learning linear threshold functions in the presence of classification noise", Proceedings of the seventh annual conference on Computational learning theory, (1994), 340-347.
Clark, Alex, "Pillow (PIL Fork) Documentation, Release 6.2.1", (2019), 203 pgs.
Deng, J., et al., "ImageNet: A Large-Scale Hierarchical Image Database", IEEE Computer Vision and Pattern Recognition, (2009), 248-255.
Dutt Jain, S, "Predicting sufficient annotation strength for interactive foreground segmentation", Proceedings of the IEEE International Conference on Computer Vision, (2013), 1313-1320.
Grandvalet, Yves, et al., "Entropy Regularization", Semi-supervised learning, MIT Press, (2006), 151-168.
Hunter, John, "Matplotlib: A 2D graphics environment", Computing in science & engineering, 9(3), (2007), 90-95.
Iandola, F. N., "Squeezenet: Alexnet-level accuracy with 50x fewer parameters and < 0.5 Mb model size", arXiv:1602.07360v4 [cs.CV] Nov. 4, 2016, (2016), 13 pgs.
Israel, Steven, et al., "ECG to identify individuals", Pattern Recognition 38(1), (2005), 133-142.
Israel, Steven, et al., "Fusing face and ECG for personal identification", Applied Imagery Pattern Recognition Workshop Proceedings,32nd, (2003), 226-231.
Israel, Steven, "Performance metrics: how and when", Geocarto International, vol. 21, No. 2, (2006), 23-32.
Jindal, I. "Learning deep networks from noisy labels with dropout regularization", Data Mining (ICDM),, (2016), 967-972.
Krizhevsky, A., et al., "ImageNet classification with deep convolutional neural networks", Advances in Neural Information Processing Systems, 25(2), (2012), 1097-1105.
Krizhevsky, Alex, "Learning Multiple Layers of Features from Tiny Images", In Technical Report of University of Toronto, (Apr. 8, 2009), 1-60.
Larsen, Jan, et al., "Design of Robust Neural Network Classifiers", Proceedings of the 1998 IEEE International Conference on vol. 2, (1998), 1205-1208.
Lawrence, N D, "Estimating a kernel fisher discriminant in the presence of label noise", ICML, vol. 1, (2001), 306-313.
Lecun, Y, et al., "The MNIST Database of handwritten digits", [Online]. Retrieved from the Internet: <URL: http://yann.lecun.com/exdb/mnist/> (Accessed Nov. 18, 2019), 7 pgs.
Lee, Dong-Hyun, "Pseudo-label: The simple and efficient semi-supervised learning method for deep neural networks", Workshop on Challenges in Representation Learning, ICML. vol. 3, (2013), 6 pgs.
Li, Yuncheng, et al., "Leaning from Noisy Labels with Distillation", IEEE International Conference on Computer Vision, (2017), 9 pgs.
Liu, Wei, et al., "SSD: Single Shot MultiBox Detector", CVPR, arXiv:1512.02325v5 [cs.CV] Dec. 29, 2016, (2016), 17 pgs.

(56) References Cited

OTHER PUBLICATIONS

Markidis, S., "INVIDIA Tensor Core Programmability, Performance & Precision", arXiv:1803.04014v1, (2018), 12 pgs.

Metzen, J H, et al., "On detecting adversarial perturbations", International Conference on Learning Representations, (2017), 12 pgs.

Metzen, J H, et al.. "Universal adversarial perturbations against semantic image segmentation", arXiv:1704.05712v3, (2017), 17 pgs.

Mnih, V, et al., "Learning to Label Aerial Images from Noisy Data", Proceedings of the 29th International Conference on Machine Learning (ICML-12), (2012), 567-574.

Moosavi-Dezfooli, Seyed-Mohsen, et al., "Universal adversarial perturbations", Computer Vision and Pattern Recognition. IEEE. arXiv:1610.08401v3 [cs.CV], (2017), 11 pgs.

Mullen, James, et al., "Comparing the Effects of Annotation Type on Machine Learning Detection Performance", IEEE Conference on Computer Vision and Pattern Recognition Worksops, (2019), 7 pgs.

Natarajan. N, et al., "Learning with Noisy Labels", Advances in neural information processing systems, (2013), 1196-1204.

Nigam, Kamal, et al., "Analyzing the Effectiveness and Applicability of Co-training", Proceeding of the Ninth International Conference on Information and Knowledge Manangement, (Nov. 2000) 8 pgs.

Papernot, Nicolas, et al., "Distillation as a Defense to Adversarial Perturbations Against Deep Neural Networks", 37th IEEE Symposium on Security & Privacy, (2016), 582-597.

Reed, S. E.: et al., "Training Deep Neural Networks on Noisy Labels with Bootstrapping", arXiv:1412.6596v3 [cs.Cv], (2014), 1-11.

Rolnick, David, et al., "Deep Learning is robust to massive label noise", arXiv:1705.10694v1, (2017), 10 pgs.

Rosenberg, C. et al., "Semi-supervised self-training of object detection models.", Proceedings of the Seventh IEEE Workshop on Applications of Computer Vision, vol. 1, (2005), 8 pgs.

Ruder, S, "An overview of gradient descent optimization algorithms", arXiv preprint arXiv:1609.04747., (2017), 14 pgs.

Sermanet, Pierre, et al., "Overfeat: Integrated recognition, localization and detection using convolutional networks", arXiv preprin tarXiv, (2013), 16 pgs.

Simard, et al., "Best Practices for Convolutional Neural Networks applied to Visual Document Analysis", In Proceedings of the Seventh International Conference on Document Analysis and Recognition, vol. 2, (2003), 6 pgs.

Simonyan, Karen, et al., "Very Deep Convolutional Networks for Large-Scale Image Recognition." ICLR 2015, arXiv:1409.1556, (Apr. 10, 2015), 14 pgs.

Srivastava, N., et al., "Dropout A Simple Way to Prevent Neural Networks from Overfitting", In Journal of Machine Learning Research, 15(1), (Jan. 2014), 1929-1958.

Sukhbaatar, S., et al., "Learning from noisy labels with deep neural networks.", arXiv preprint arXiv:1406.2080, (2014), 1-10.

Tanner, Franklin, et al., "Overhead Imagery Research Data Set—An annotated data library and tools to aid in the development of computer vision algorithms", IEEE Applied Imagery Pattern Recognition Workshop, (2009), 1-8.

Woods, Kevin, et al., "Generating ROC curves for artificial neural networks", EEE Transactions on Medical Imaging, vol. 16, No. 3,, (Jun. 1997), 329-337.

Xiao, Tong, et al., "Learning from Massive Noisy Labeled Data for Image Classi?cation", In CVPR, (2015), 2691-2699.

Zhao, Zhong-Qiu, "Object Detection with Deep Learning: A Review", IEEE Transactions on Neural Networks and Learning System. arXiv:1807.05511v2 [cs.CV], (2019), 21 pgs.

Zhu, X, et al, "Class noise vs. attribute noise: A quantitative study", Artificial Intelligence Review, 22, (2004), 177-210.

* cited by examiner

COMPUTER ARCHITECTURE FOR OBJECT DETECTION USING POINT-WISE LABELS

RELATED APPLICATION

This application relates to U.S. patent application Ser. No. 16/413,730, filed on May 16, 2019, and titled, "MACHINE LEARNING USING INFORMED PSEUDOLABELS," the entire content of which is incorporated herein by reference.

TECHNICAL FIELD

Embodiments pertain to computer architecture. Some embodiments relate to image processing and object detection within visual data. Some embodiments relate to a computer architecture for object detection using point-wise labels.

BACKGROUND

Advancements in machine classification have demonstrated dramatic improvement through the use of deep neural networks (DNNs) trained in a supervised fashion. To meet ever-increasing demands of classification performance and problem complexity, network depths continue to increase. This places a heavy demand on the size of the training sets required to avoid over-fitting additional free parameters, or weights, of the network. In many cases, hundreds of thousands or even millions of training examples must be assigned class labels. This class labelling is often done by crowd-sourcing. The volume of data makes enforcing labeling consistency and filtering out incorrect labels both challenging and costly. Training with such 'noisy labels' can drastically degrade classification performance. This makes efforts of quality control a cost factor to be balanced with the desired performance. In other cases, automation or data mining provide a means to obtain labels, however, the labels are only approximate.

SUMMARY

The present disclosure generally relates to machines configured to provide object detection using point-wise labels, including computerized variants of such special-purpose machines and improvements to such variants, and to the technologies by which such special-purpose machines become improved compared to other special-purpose machines. In particular, the present disclosure addresses a computer architecture for object detection using point-wise labels.

According to some aspects of the technology described herein, a neural network apparatus includes processing circuitry and memory. The memory stores a plurality of images of a target. The processing circuitry is configured to: access, from the memory, a first image and an identification of a centroid pixel of the target within the first image; generate, based on a geometry of the target and the centroid pixel, a confidence map indicating, for each pixel in the first image, a confidence value that the pixel includes the target; train, using the plurality of images of the target, including the first image and the confidence map, an artificial neural network to identify the target in visual data; and provide an output representing the trained artificial neural network.

Other aspects include a method to perform the operations of the processing circuitry above, and a machine-readable medium storing instructions for the processing circuitry to perform the above operations.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As discussed above, generating a dataset of images of a target using rectangular or more exact (e.g., shaped like the target) bounding boxes may be expensive. Accordingly, new techniques for generating a training dataset for a neural network, and training a neural network with that training dataset, may be desirable.

According to some implementations, a computer memory (e.g., a memory of a computer or a remote data repository) stores a plurality of images of a target (to be identified by a neural network, for example, a cat for a cat-identification neural network or a car for a car-identification neural network). A computing machine accesses, from the computer memory, a first image and an identification of a centroid pixel of the target within the first image. The centroid pixel may be identified manually by a human user or automatically using other artificial intelligence techniques. The computing machine generates, based on a geometry of the target and the centroid pixel, a confidence map indicating, for each pixel in the first image, a confidence value that the pixel includes the target. The computing machine trains, using the plurality of images of the target, including the first image and the confidence map, an artificial neural network to identify the target in visual data. The computing machine provides an output representing the trained artificial neural network.

Later, the trained artificial neural network may be used for inference. The computing machine (or another computing machine with access to the trained artificial neural network) receives a new image. The computing machine identifies, using the trained artificial neural network, a position of the target in the new image (i.e., whether the target is present in the image and which pixels include the target).

As used herein, the term "computing machine" may include a single computing machine or multiple computing machines. A computing machine may include any device or combination of devices that includes processing circuitry and memory. The processing circuitry and the memory may reside in the same device or in different devices.

Throughout this document, some method(s) (e.g., in FIG. 6) are described as being implemented serially and in a given order. However, unless explicitly stated otherwise, the operations of the method(s) may be performed in any order. In some cases, two or more operations of the method(s) may be performed in parallel using any known parallel processing techniques. In some cases, some of the operation(s) may be skipped and/or replaced with other operations. Furthermore, skilled persons in the relevant art may recognize other operation(s) that may be performed in conjunction with the operation(s) of the method(s) disclosed herein.

Figure 1:
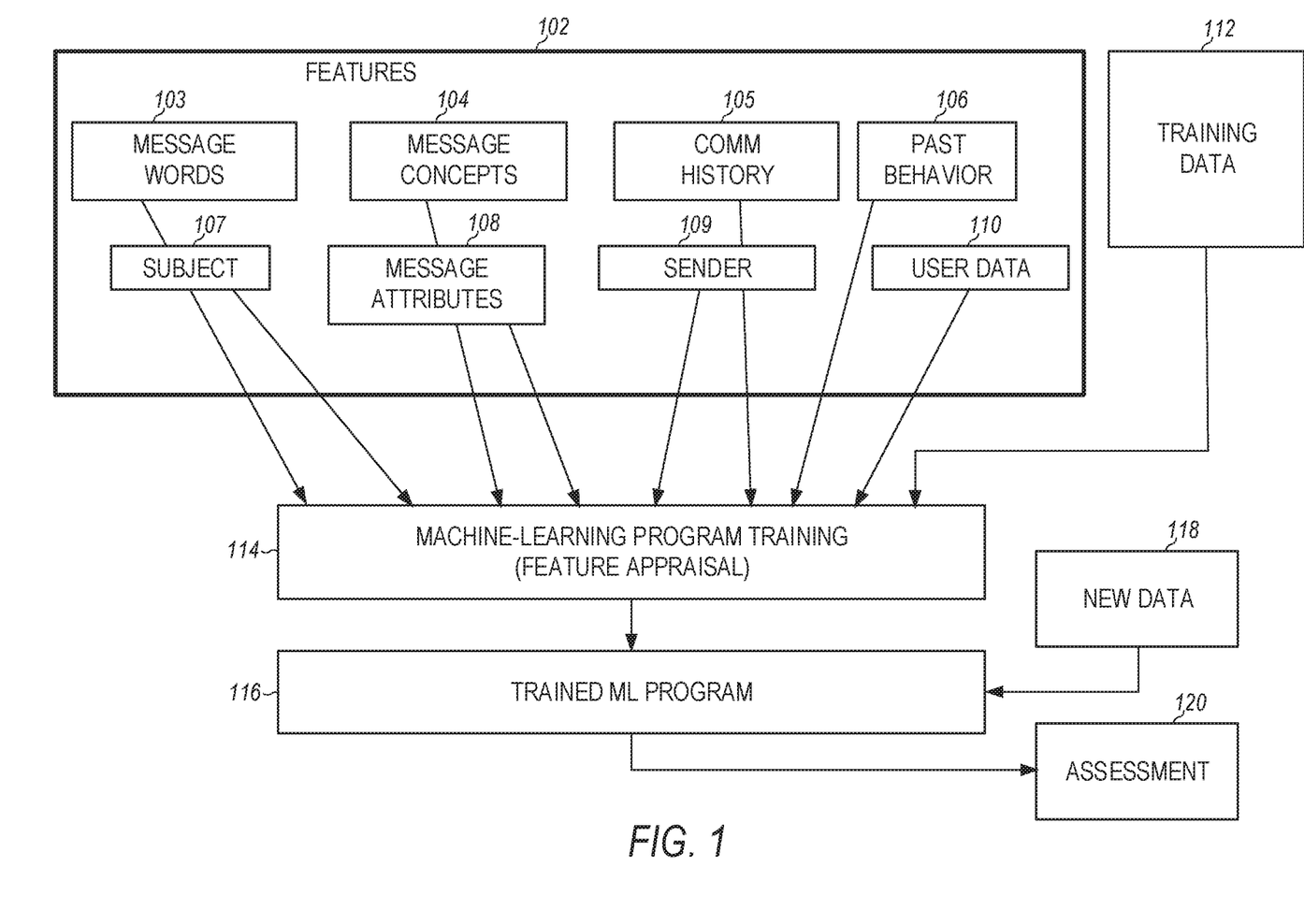
FIG. 1 illustrates the training and use of a machine-learning program, in accordance with some embodiments.

FIG. 1 illustrates the training and use of a machine-learning program, according to some example embodiments. In some example embodiments, machine-learning programs (MLPs), also referred to as machine-learning algorithms or tools, are utilized to perform operations associated with machine learning tasks, such as image recognition or machine translation.

Machine learning is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data 112 in order to make data-driven predictions or decisions expressed as outputs or assessments 120. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange). Regression algorithms aim at quantifying some items (for example, by providing a value that is a real number). The machine-learning algorithms utilize the training data 112 to find correlations among identified features 102 that affect the outcome.

The machine-learning algorithms utilize features 102 for analyzing the data to generate assessments 120. A feature 102 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 102 may be of different types and may include one or more of words of the message 103, message concepts 104, communication history 105, past user behavior 106, subject of the message 107, other message attributes 108, sender 109, and user data 110.

The machine-learning algorithms utilize the training data 112 to find correlations among the identified features 102 that affect the outcome or assessment 120. In some example embodiments, the training data 112 includes labeled data, which is known data for one or more identified features 102 and one or more outcomes, such as detecting communication patterns, detecting the meaning of the message, generating a summary of the message, detecting action items in the message, detecting urgency in the message, detecting a relationship of the user to the sender, calculating score attributes, calculating message scores, etc.

With the training data 112 and the identified features 102, the machine-learning tool is trained at operation 114. The machine-learning tool appraises the value of the features 102 as they correlate to the training data 112. The result of the training is the trained machine-learning program 116.

When the machine-learning program 116 is used to perform an assessment, new data 118 is provided as an input to the trained machine-learning program 116, and the machine-learning program 116 generates the assessment 120 as output. For example, the machine-learning program 116 may be asked to count the number of sedans and pickup trucks in a parking lot between 10:00 and 11:00. The machine-learning program 116 determines the required image quality to extract the information that is needed. The machine-learning program 116 determines if a target model exists for sedans and pickup trucks. The machine-learning program 116 locates images having the required image quality to extract the information that is needed. If such images do not exist for the given time and geographic location parameters, the machine-learning program 116 requests collection of such images for the given time and geographic location parameters. Upon receiving the requested or located images, the machine-learning program 116 pushes the images to the appropriate model.

Machine learning techniques train models to accurately make predictions on data fed into the models. During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that is has not been trained on. In a second example, a false positive rate or false negative rate may be used to evaluate the models after finalization. In a third example, a delineation between data clusterings is used to select a model that produces the clearest bounds for its clusters of data.

Figure 2:
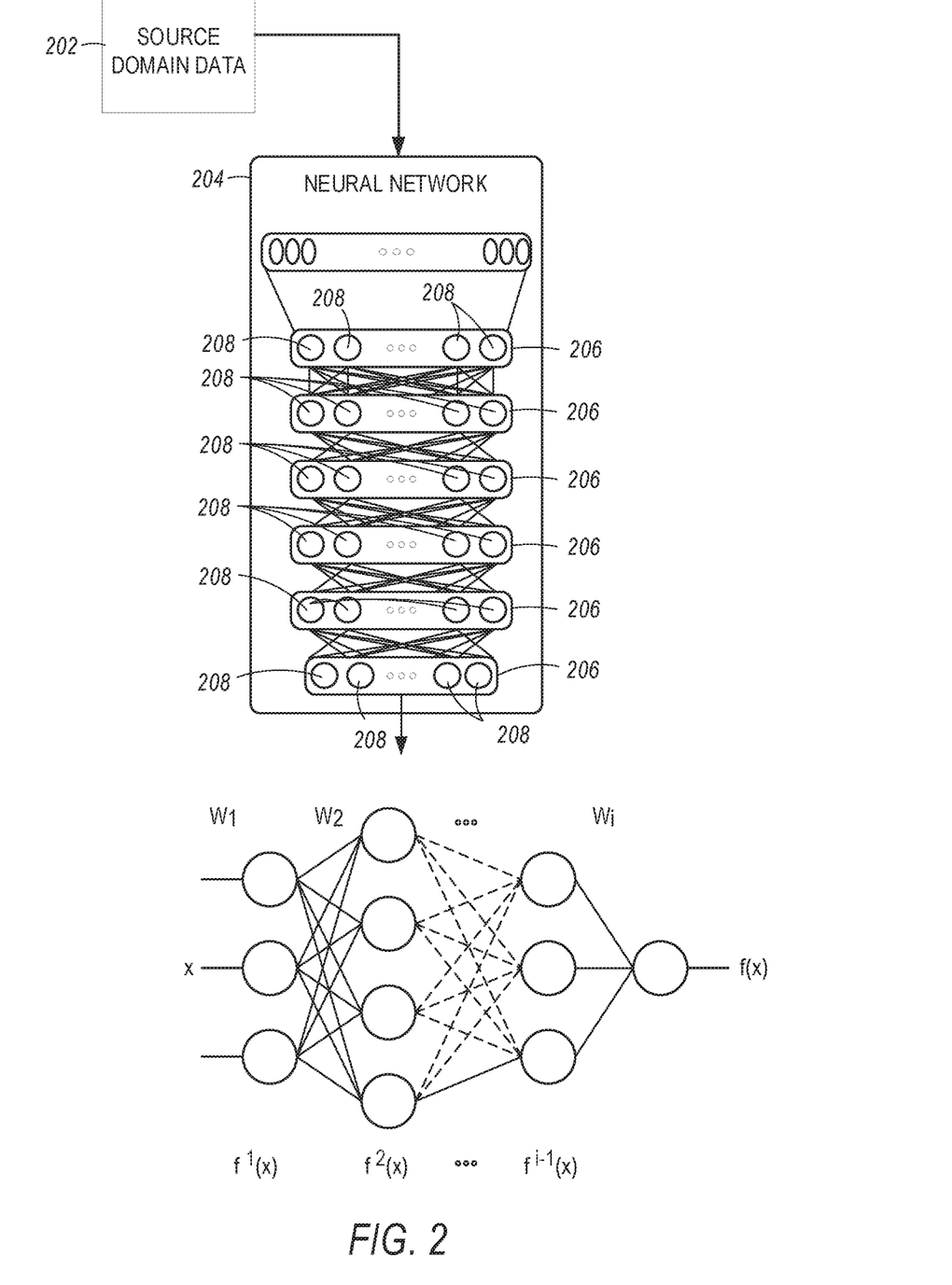
FIG. 2 illustrates an example neural network, in accordance with some embodiments.

FIG. 2 illustrates an example neural network 204, in accordance with some embodiments. As shown, the neural network 204 receives, as input, source domain data 202. The input is passed through a plurality of layers 206 to arrive at an output. Each layer 206 includes multiple neurons 208. The neurons 208 receive input from neurons of a previous layer and apply weights to the values received from those neurons in order to generate a neuron output. The neuron outputs from the final layer 206 are combined to generate the output of the neural network 204.

As illustrated at the bottom of FIG. 2, the input is a vector x. The input is passed through multiple layers 206, where weights $W_1, W_2, \ldots, W_i$ are applied to the input to each layer to arrive at $f^1(x), f^2(x), \ldots, f^{i-1}(x)$, until finally the output f(x) is computed.

In some example embodiments, the neural network 204 (e.g., deep learning, deep convolutional, or recurrent neural network) comprises a series of neurons 208. A neuron 208 is an architectural element used in data processing and artificial intelligence, particularly machine learning on the weights of inputs provided to the given neuron 208. Each of the neurons 208 used herein are configured to accept a predefined number of inputs from other neurons 208 in the neural network 204 to provide relational and sub-relational outputs for the content of the frames being analyzed. Individual neurons 208 may be chained together and/or organized in various configurations of neural networks to provide interactions and relationship learning modeling for how each of the frames in an utterance are related to one another.

For example, a neural network node serving as a neuron includes several gates to handle input vectors (e.g., sections of an image), a memory cell, and an output vector (e.g., contextual representation). The input gate and output gate control the information flowing into and out of the memory cell, respectively. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks utilize features for analyzing the data to generate assessments (e.g., patterns in an image). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of biological neural networks of animal brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Figure 3:
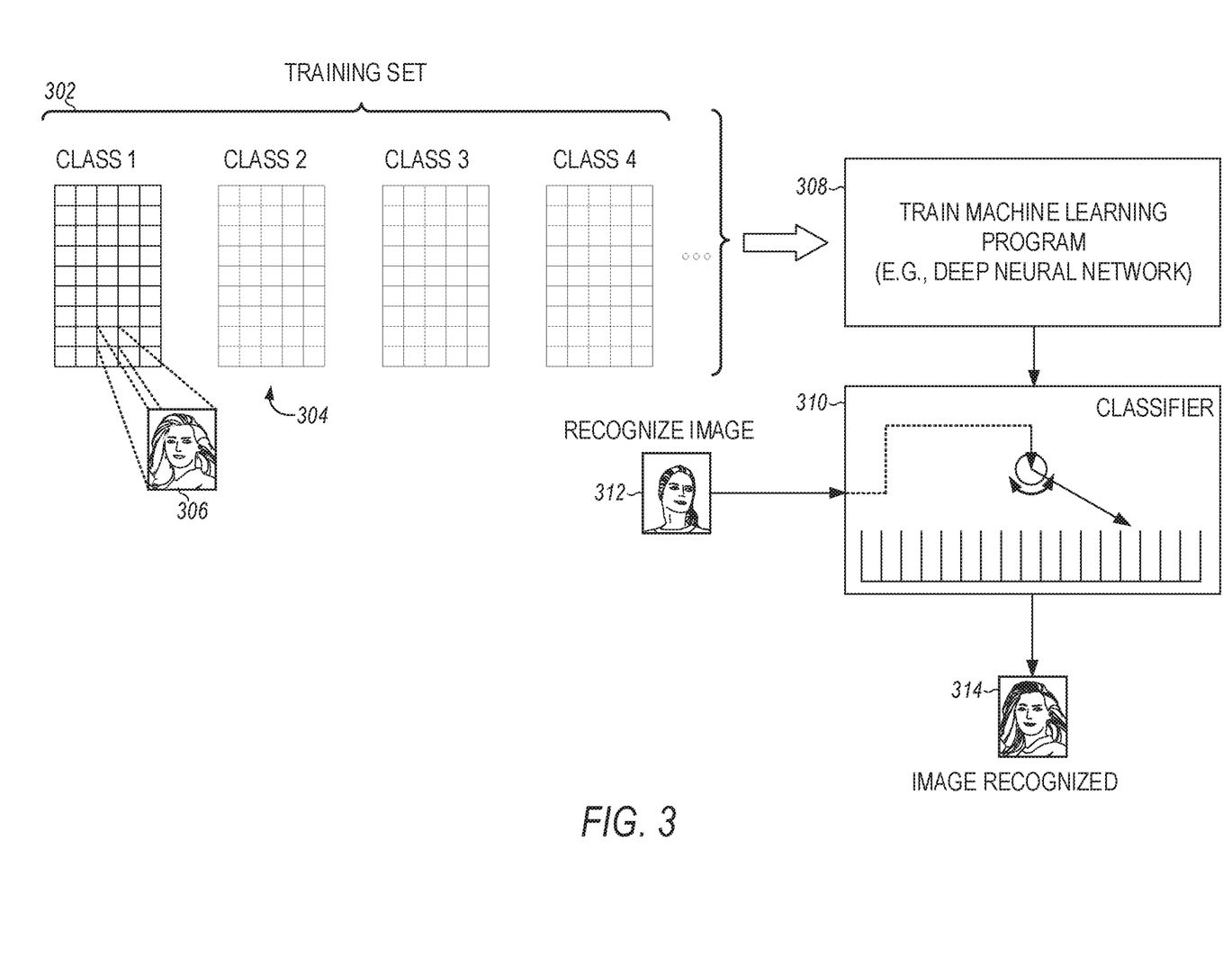
FIG. 3 illustrates the training of an image recognition machine learning program, in accordance with some embodiments.

FIG. 3 illustrates the training of an image recognition machine learning program, in accordance with some embodiments. The machine learning program may be implemented at one or more computing machines. Block 302 illustrates a training set, which includes multiple classes 304. Each class 304 includes multiple images 306 associated with the class. Each class 304 may correspond to a type of object in the image 306 (e.g., a digit 0-9, a man or a woman, a cat or a dog, etc.). In one example, the machine learning program is trained to recognize images of the presidents of the United States, and each class corresponds to each president (e.g., one class corresponds to Donald Trump, one class corresponds to Barack Obama, one class corresponds to George W. Bush, etc.). At block 308 the machine learning program is trained, for example, using a deep neural network. At block 310, the trained classifier, generated by the training of block 308, recognizes an image 312, and at block 314 the image is recognized. For example, if the image 312 is a photograph of Bill Clinton, the classifier recognizes the image as corresponding to Bill Clinton at block 314.

FIG. 3 illustrates the training of a classifier, according to some example embodiments. A machine learning algorithm is designed for recognizing faces, and a training set 302 includes data that maps a sample to a class 304 (e.g., a class includes all the images of purses). The classes may also be referred to as labels. Although embodiments presented herein are presented with reference to object recognition, the same principles may be applied to train machine-learning programs used for recognizing any type of items.

The training set 302 includes a plurality of images 306 for each class 304 (e.g., image 306), and each image is associated with one of the categories to be recognized (e.g., a class). The machine learning program is trained 308 with the training data to generate a classifier 310 operable to recognize images. In some example embodiments, the machine learning program is a DNN.

When an input image 312 is to be recognized, the classifier 310 analyzes the input image 312 to identify the class (e.g., class 314) corresponding to the input image 312.

Figure 4:
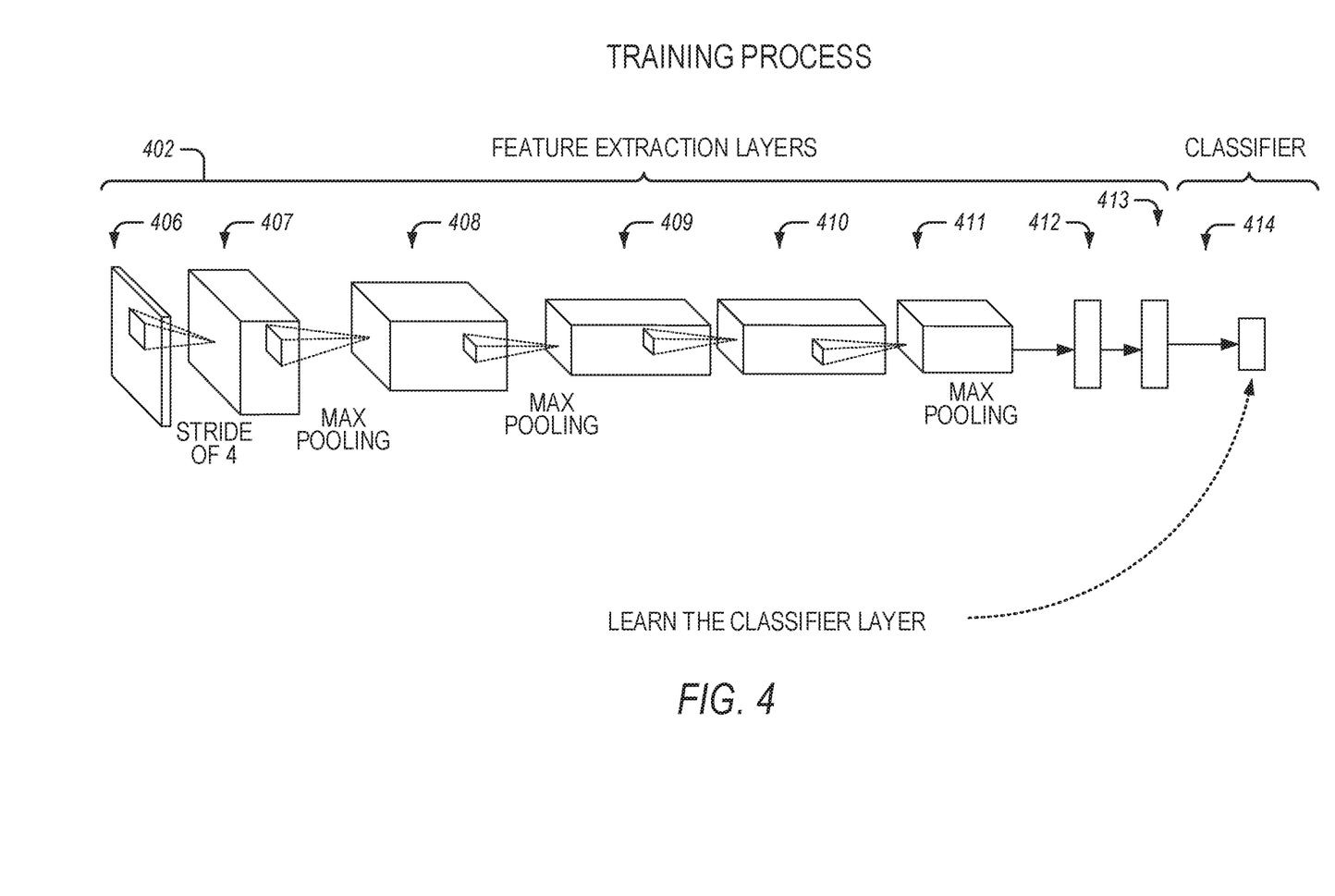
FIG. 4 illustrates the feature-extraction process and classifier training, in accordance with some embodiments.

FIG. 4 illustrates the feature-extraction process and classifier training, according to some example embodiments. Training the classifier may be divided into feature extraction layers 402 and classifier layer 414. Each image is analyzed in sequence by a plurality of layers 406-413 in the feature-extraction layers 402.

With the development of deep convolutional neural networks, the focus in face recognition has been to learn a good face feature space, in which faces of the same person are close to each other, and faces of different persons are far away from each other. For example, the verification task with the LFW (Labeled Faces in the Wild) dataset has been often used for face verification.

Many face identification tasks (e.g., MegaFace and LFW) are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources required to describe a large set of data. When performing analysis of complex data, one of the major problems stems from the number of variables involved. Analysis with a large number of variables generally requires a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as be reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc. Eventually this DNN produces outputs by classifier 414. In FIG. 4, the data travels from left to right and the features are extracted. The goal of training the neural network is to find the parameters of all the layers that make them adequate for the desired task.

As shown in FIG. 4, a "stride of 4" filter is applied at layer 406, and max pooling is applied at layers 407-413. The stride controls how the filter convolves around the input volume. "Stride of 4" refers to the filter convolving around the input volume four units at a time. Max pooling refers to down-sampling by selecting the maximum value in each max pooled region.

In some example embodiments, the structure of each layer is predefined. For example, a convolution layer may contain small convolution kernels and their respective convolution parameters, and a summation layer may calculate the sum, or the weighted sum, of two pixels of the input image. Training assists in defining the weight coefficients for the summation.

One way to improve the performance of DNNs is to identify newer structures for the feature-extraction layers, and another way is by improving the way the parameters are identified at the different layers for accomplishing a desired task. The challenge is that for a typical neural network, there may be millions of parameters to be optimized. Trying to optimize all these parameters from scratch may take hours, days, or even weeks, depending on the amount of computing resources available and the amount of data in the training set.

FIG. 4 is described in conjunction with a "stride of 4." However, it should be noted that any other positive integer stride value may be used. Also, FIG. 4 describes some but not all examples of stages of neural network processing. Some aspects of the technology disclosed herein may implement one or more of: convolution, skip connections, activation, batch normalization, dropout, and the predictive function. Skip connections include shortcuts to jump over some layers (e.g., layer m provides input directly to layer m+2). An activation is a minimum amount of input that causes an artificial neuron to "fire" an output. Batch normalization is a technique for training very deep neural networks that standardizes the inputs to a layer for each mini-batch. This has the effect of stabilizing the learning process and dramatically reducing the number of training epochs required to train deep networks. Dropout sets the output of some neurons to zero in order to prevent a neural network from overfitting. The idea of dropout is to randomly drop units (along with their connections) from the artificial neural network during training. This prevents the units from co-adapting too much.

Figure 5:
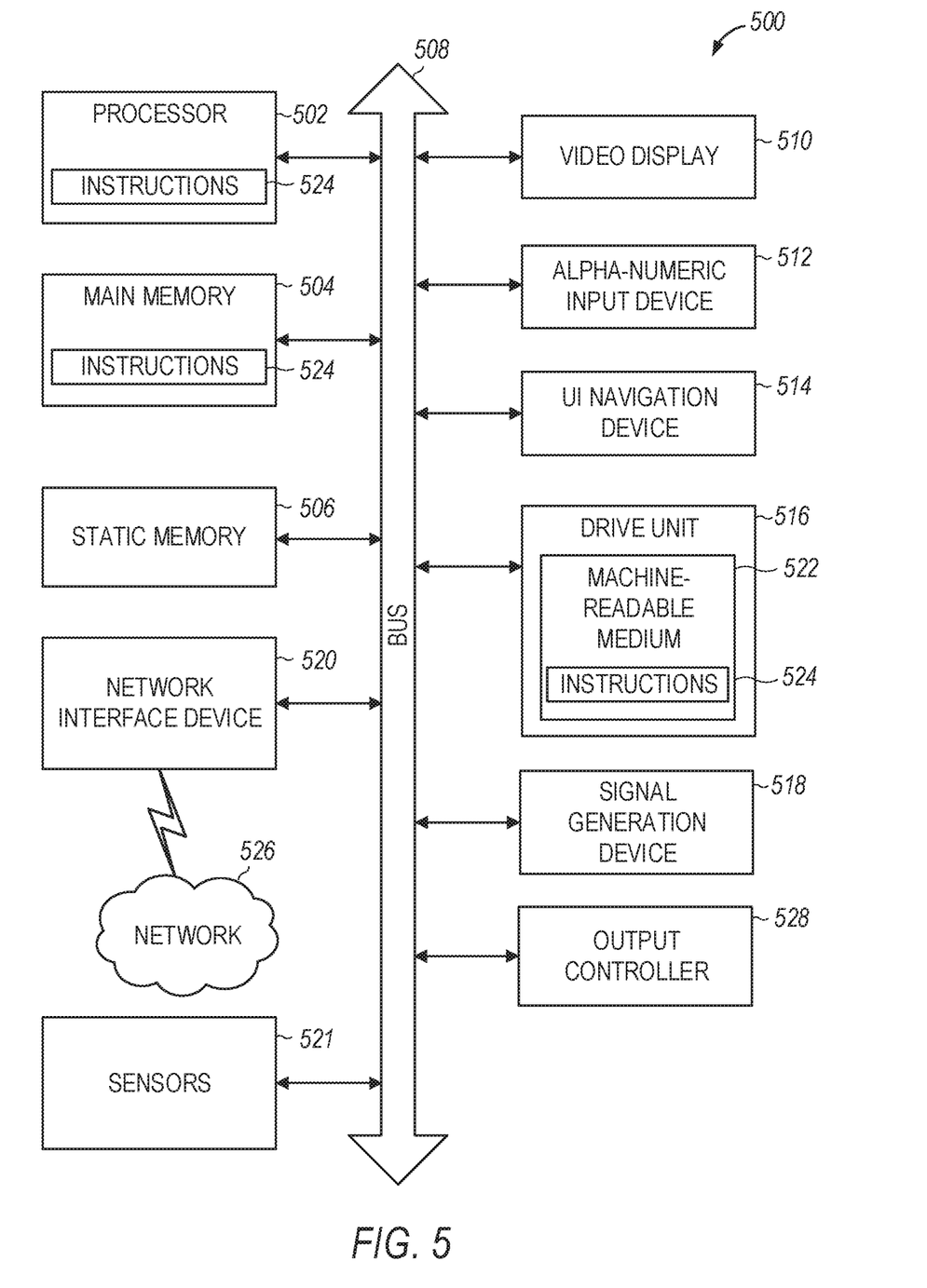
FIG. 5 is a block diagram of a computing machine, in accordance with some embodiments.

FIG. 5 illustrates a circuit block diagram of a computing machine 500 in accordance with some embodiments. In some embodiments, components of the computing machine 500 may store or be integrated into other components shown in the circuit block diagram of FIG. 5. For example, portions of the computing machine 500 may reside in the processor 502 and may be referred to as "processing circuitry." Processing circuitry may include processing hardware, for example, one or more central processing units (CPUs), and one or more graphics processing units (GPUs), and the like. In alternative embodiments, the computing machine 500 may operate as a standalone device or may be connected (e.g., networked) to other computers. In a networked deployment, the computing machine 500 may operate in the capacity of a server, a client, or both in server-client network environments. In an example, the computing machine 500 may act as a peer machine in peer-to-peer (P2P) (or other distributed) network environment. In this document, the phrases P2P, device-to-device (D2D) and sidelink may be used interchangeably. The computing machine 500 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 500 may include a hardware processor 502 (e.g., a central processing unit (CPU), a GPU, a hardware processor core, or any combination thereof), a main memory 504 and a static memory 506, some or all of which may communicate with each other via an interlink (e.g., bus) 508. Although not shown, the main memory 504 may contain any or all of removable storage and non-removable storage, volatile memory or non-volatile memory. The computing machine 500 may further include a video display unit 510 (or other display unit), an alphanumeric input device 512 (e.g., a keyboard), and a user interface (UI) navigation device 514 (e.g., a mouse). In an example, the display unit 510, input device 512 and UI navigation device 514 may be a touch screen display. The computing machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The computing machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 516 (e.g., a storage device) may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the computing machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the computing machine 500 and that cause the computing machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526.

The technology disclosed herein uses various engines, each of which is constructed, programmed, configured, or otherwise adapted, to carry out a function or set of functions. The term "engine" as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

Figure 6:
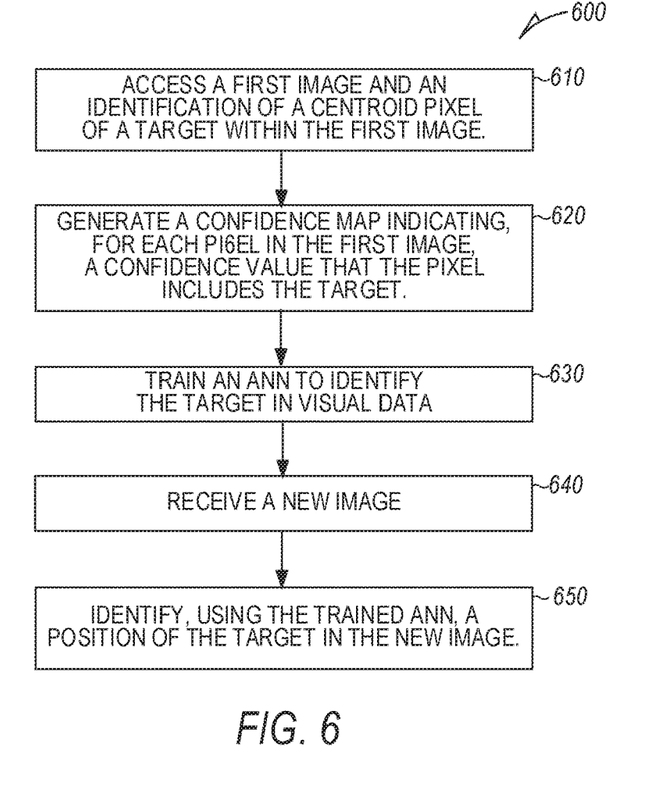
FIG. 6 is a flow chart of a method for training and inferencing with an artificial neural network for target identification, in accordance with some embodiments.

FIG. 6 is a flow chart of a method for training and inferencing with an artificial neural network for target identification, in accordance with some embodiments.

At operation 610, the computing machine accesses, from a memory (e.g., a local memory of the computing machine or a remote data repository), a first image and an identification of a centroid pixel of a target within the first image. The memory stores a plurality of images of the target. The plurality of images include the first image.

At operation 620, the computing machine generates, based on a geometry of the target and the centroid pixel, a confidence map indicating, for each pixel in the first image, a confidence value that the pixel includes the target. In some examples, the computing machine determines a first radius and a second radius. The first radius corresponds to a smallest possible size of the target and the second radius corresponds to a largest possible size of the target. Pixels closer to the centroid than the first radius have a confidence value above a first threshold (e.g., 99.9%). Pixels further from the centroid than the second radius have a confidence value below a second threshold (e.g., 1%). Pixels having a distance between the first radius and the second radius from the centroid have confidence values confidence values between the second threshold and the first threshold. In some cases, the confidence value of a given pixel of the first image is based at least on the distance between the given pixel and the centroid pixel.

Generating the confidence map may include analytically deriving the confidence map based on the geometry of the target and its potential distance and orientation relative to the imaging device. For example, if the target has a rectangular shape, generating the confidence map may include assigning a high (e.g., >90%) confidence value to pixels within the rectangular shape and a low (e.g., <5%) confidence value to pixels outside the rectangular shape. Generating the confidence map may include empirically measuring the confidence map based on imagery with detailed labels of the target. Generating the confidence map may include generating the confidence map from simulations using a sensor model of the target or a three-dimensional model of the target. In some examples, the confidence map is generated using a 1×1 convolution layer or a plurality of deconvolution layers.

At operation 630, the computing machine trains, using the plurality of images of the target, including the first image and the confidence map, an artificial neural network (ANN) to identify the target in visual data. The computing machine may provide an output representing the trained ANN. For example, if the computing machine is a server, the computing machine may transit the trained ANN to a client device for inference thereat. The output representing the trained ANN may be a message that the ANN has been trained or may be a provision of all or a part of the trained ANN for storage (e.g., in a data repository).

In some cases, while training the ANN, the computing machine derives, for each of one or more pixels in the first image, a pseudo-label based on the confidence map and output of the artificial neural network in a partially trained state, wherein the pseudo-labels are used to further train the artificial neural network. In some examples, the pseudo-label for a given pixel assigns a class to the given pixel, the class being one of: a background class, a target class, and a class associated with another target different from the target. In some examples, the pseudo-labels are computed to maximize a computed posterior probability that the given pixel corresponds to the assigned class based on the confidence map. The computed posterior probability is computed based on the artificial neural network in the partially trained state. The pseudo-labels may be initialized using a thresholded filter of the confidence map.

At operation 640, the computing machine (or another computing machine) receives a new image.

At operation 650, the computing machine identifies, using the trained ANN, a position of the target in the new image.

The computing machine provides an output representing the position of the target in the new image. It should be noted that the posterior distribution can provide shape information from the data.

Some embodiments are described above in conjunction with a single target. However, there could be multiple targets, with confidences for each target as to whether a pixel is associated with each target. In some examples, the target is one of a plurality of targets, each of the plurality of targets being associated with a corresponding plurality of images.

Figure 7:
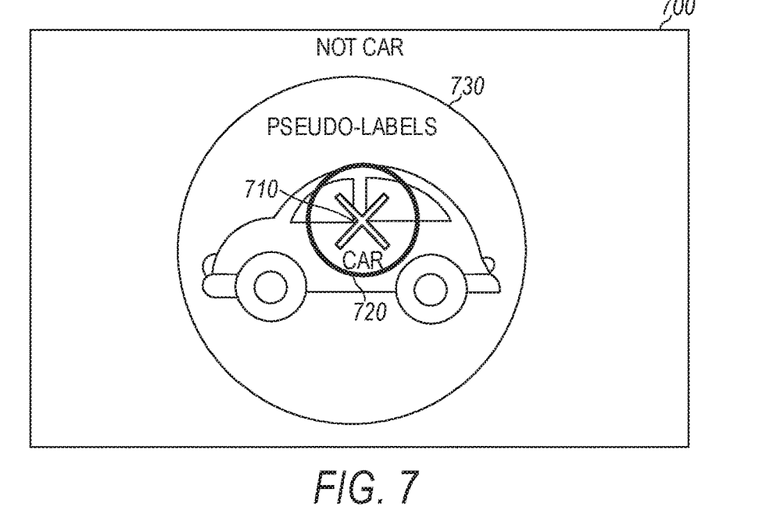
FIG. 7 illustrates an example image including pseudo-labeled pixels, in accordance with some embodiments.

FIG. 7 illustrates an example image 700 including pseudo-labeled pixels, in accordance with some embodiments.

As shown, the image 700 depicts a car, and may be used to train an artificial neural network to identify car(s) in visual data. A centroid 710 of the car is identified (e.g., by a human user or by other artificial intelligence). A circle 720 and a circle 730 are illustrated. The circles 720 and 730 have radii determined based on an expected size of the car, so as to ensure that pixels inside the circle 720 are part of the car and pixels outside the circle 730 are not part of the car. As such, pixels inside the circle 720 are labeled "car" with a high confidence value for including the car. Pixels outside the circle 730 are labeled "not car" with a low confidence value for including the car. Pixels inside the circle 730 and outside the circle 720 may either include the car or not include the car. Those pixels are assigned pseudo-labels or confidence values indicating uncertainty regarding whether they include the car.

For example, the confidence values for pixels inside the circle 730 and outside the circle 720 may be between 5% and 96%. In some cases, additional knowledge about the size or shape of the car may be used to adjust the confidence values of at least a portion of the pixels inside the circle 730 and outside the circle 720.

Some aspects apply an ANN to an automated target recognition (ATR) problem. Traditionally, ANNs operated on small images, where the target occupies a large portion (e.g., >25%) of the pixels in the image. However, traditional ANNs may be less useful where the image is large and the target is small (e.g., the target occupies<1% of the pixels in the image). To generate the training dataset, one approach places a bounding box around a target. Another approach identifies a centroid of the target and adds a predetermined radius around the centroid.

One or more of the following three approaches may be used to generate the noise model. (1) If the target geometry is simple (e.g., the target is at a fixed distance relative to the camera and its orientation only varies in the boresight direction), the confidence map can be analytically derived. (2) If imagery with detailed labels (e.g., polygon, full segmentation) of the target are available, the confidence map can be empirically measured from the data. (3) If a sensor model and a three-dimensional (3D) model of the target are both available, the confidence map can be generated from simulations.

During training, pseudo-labels are set at each epoch of training, after a small fixed number of epochs, with maximum a-posteriori (MAP) estimates which represent the most probable labels given both the noise model and the network output for each pixel. The pseudo-labels may be initialized directly to the noise model or a thresholded version of the noise model (e.g., P(target)>0.5).

Some aspects are directed to a process for training an object detection convolutional neural network (CNN) with center point (centroid) labels. An image is processed with the base CNN. A class map is formed based on feature map output from an intermediary or final layer of a CNN. Center point (centroid) labels are converted to pixel-wise labels with an associated noise model. Pseudo-labels are declared in the class map space and initialized based on the noise model. The training process minimizes cross-entropy between the class map and pseudo-labels. As the training process progresses, the pseudo-labels are updated according to network output during training. In some cases, a 1×1 convolutional layer or series of deconvolutional layers is applied to the existing CNN feature map to form the class map. The pseudo-labels can be initialized directly from the noise model or from a thresholded filter.

In some aspects, the training schema acts on a feature map, which can be the output of an intermediary layer or the final convolutional layer of a neural network. In some cases, CNNs provide feature maps at several downsampled resolutions for tuning the fidelity of the output coordinates and network depth. The computing machine first processes the feature map with either a 1×1 filter convolutional layer or one or more deconvolutional layers that increase the feature map size and reduce the output channels to match the number of target classes plus one for the background. The output of this filter is a downsampled or full resolution map with a vector of logits corresponding to our list of labels at each pixel.

At inference, some aspects apply the appropriate regression model function to convert the logits to probabilities. At training, the cross-entropy can be similarly calculated and accumulated into a loss value. However, in some aspects, each pixel is labeled for the cross-entropy. In some examples, a center point is known for each target. Those coordinates are converted to the corresponding pixels in the feature map space which are then assigned the target labels. The target is potentially present within pixels surrounding the center point. The computing machine may assign pseudo-labels to these pixels with the initial values set according to a confidence map or noise model.

In some cases, background pixels may outnumber target pixels. In these cases, if all pixels are equally weighted there is a risk that the artificial neural network learns that always predicting background is an easy way to minimize loss. To prevent this, some aspects adjust the weights for a given batch such that the total potential loss contribution of all target pixels is equal to the total potential contribution from background pixels that are not on the ignore list. Some aspects may still train on pure background images while avoiding divide by zero errors as long as at least one image with target(s) is included in each batch.

Some aspects leverage a noise model in the pixel-domain to account for the uncertainty in object extent due to training a deep network with centroids rather than polygon annotations. Centroids might provide a significantly lower cost alternative to polygons or bounding boxes. In some cases, this technique accounts for and mitigates the impact to classifier accuracy for centroid annotations providing significant cost savings for similar performance.

Some aspect impose an ignore buffer in a feature map around a pointwise labeled object centroid to reflect uncertainty on the object's presentation within an image. Some aspects weight the loss function such that the small number of target pixels are balanced with the large number of background pixels within a batch.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A neural network apparatus, the apparatus comprising:
   memory storing a plurality of images of a target; and
   processing circuitry in communication with the memory, the processing circuitry configured to:
      access, from the memory, a first image and an identification of a centroid pixel of the target within the first image;
      generate, based on a geometry of the target and the centroid pixel, a confidence map indicating, for each pixel in the first image, a confidence value that the pixel includes the target;
      train, using the plurality of images of the target, including the first image and the confidence map, an artificial neural network to identify the target in visual data; and
      provide an output representing the trained artificial neural network.

2. The apparatus of claim 1, wherein generating the confidence map comprises:
   analytically deriving the confidence map based on the geometry of the target.

3. The apparatus of claim 1, wherein generating the confidence map comprises:
   empirically measuring the confidence map based on imagery with detailed labels of the target.

4. The apparatus of claim 1, wherein generating the confidence map comprises:
   generating the confidence map from simulations using a sensor model of the target or a three-dimensional model of the target.

5. The apparatus of claim 1, wherein the processing circuitry is further configured to:
   derive, for each of one or more pixels in the first image, a pseudo-label based on the confidence map and output of the artificial neural network in a partially trained state, wherein the pseudo-labels are used to further train the artificial neural network.

6. The apparatus of claim 5, wherein the pseudo-label for a given pixel assigns a class to the given pixel, the class being one of: a background class, a target class, and a class associated with another target different from the target.

7. The apparatus of claim 6, wherein the pseudo-labels are computed to maximize a computed posterior probability that the given pixel corresponds to the assigned class based on the confidence map, wherein the computed posterior probability is computed based on the artificial neural network in the partially trained state.

8. The apparatus of claim 5, wherein the pseudo-labels are initialized using a thresholded filter of the confidence map.

9. The apparatus of claim 1, wherein the confidence map is generated using a 1×1 convolution layer or a plurality of deconvolution layers.

10. The apparatus of claim 1, wherein the processing circuitry is further configured to:
    receive a new image;
    identify, using the trained artificial neural network, a position of the target in the new image; and
    provide an output representing the position of the target in the new image.

11. The apparatus of claim 1, wherein the target is one of a plurality of targets, each of the plurality of targets being associated with a corresponding plurality of images.

12. A non-transitory machine-readable medium storing instructions which, when executed by processing circuitry of a machine, cause the processing circuitry to:
    access, from a memory, a first image and an identification of a centroid pixel of a target within the first image, wherein the memory stores a plurality of images of a target, wherein the plurality of images include the first image;
    generate, based on a geometry of the target and the centroid pixel, a confidence map indicating, for each pixel in the first image, a confidence value that the pixel includes the target;

train, using the plurality of images of the target, including the first image and the confidence map, an artificial neural network to identify the target in visual data; and provide an output representing the trained artificial neural network.

13. The machine-readable medium of claim 12, wherein generating the confidence map comprises:

analytically deriving the confidence map based on the geometry of the target.

14. The machine-readable medium of claim 12, wherein generating the confidence map comprises:

empirically measuring the confidence map based on imagery with detailed labels of the target.

15. The machine-readable medium of claim 12, wherein generating the confidence map comprises:

generating the confidence map from simulations using a sensor model of the target or a three-dimensional model of the target.

16. The machine-readable medium of claim 12, wherein the processing circuitry is further configured to:

derive, for each of one or more pixels in the first image, a pseudo-label based on the confidence map and output of the artificial neural network in a partially trained state, wherein the pseudo-labels are used to further train the artificial neural network.

17. The machine-readable medium of claim 16, wherein the pseudo-label for a given pixel assigns a class to the given pixel, the class being one of: a background class, a target class, and a class associated with another target different from the target.

18. The machine-readable medium of claim 17, wherein the pseudo-labels are computed to maximize a computed posterior probability that the given pixel corresponds to the assigned class based on the confidence map, wherein the computed posterior probability is computed based on the artificial neural network in the partially trained state.

19. The machine-readable medium of claim 16, wherein the pseudo-labels are initialized using a thresholded filter of the confidence map.

20. A method comprising:

accessing, from a memory, a first image and an identification of a centroid pixel of a target within the first image, wherein the memory stores a plurality of images of a target, wherein the plurality of images include the first image;

generating, based on a geometry of the target and the centroid pixel, a confidence map indicating, for each pixel in the first image, a confidence value that the pixel includes the target;

training, using the plurality of images of the target, including the first image and the confidence map, an artificial neural network to identify the target in visual data; and providing an output representing the trained artificial neural network.

* * * * *

UNITED STATES PATENT AND TRADEMARK OFFICE
CERTIFICATE OF CORRECTION

Page 1 of 1

PATENT NO. : 11,068,747 B2
APPLICATION NO. : 16/586480
DATED : July 20, 2021
INVENTOR(S) : Goldstein et al.

It is certified that error appears in the above-identified patent and that said Letters Patent is hereby corrected as shown below:

On the Title Page

In Column 2, under item (56) "Other Publications", Line 1, delete "16/413,731," and insert --16/413,730,-- therefor In the Drawings Sheet 6 of 6, Fig. 6, reference numeral 620, Line 2, and on the title page, in the print figure, delete "PI6EL" and insert --PIXEL-- therefor In the Specification In Column 6, Line 59, delete "node' s" and insert --node's-- therefor Signed and Sealed this
Seventh Day of December, 2021

Drew Hirshfeld
*Performing the Functions and Duties of the
Under Secretary of Commerce for Intellectual Property and
Director of the United States Patent and Trademark Office*